United States Patent
Iwamura et al.

(10) Patent No.: US 8,169,928 B2
(45) Date of Patent: May 1, 2012

(54) BASE STATION, MOBILE STATION, AND CHANNEL QUALITY INFORMATION REPORTING METHOD

(75) Inventors: Mikio Iwamura, Yokohama (JP); Yoshiaki Ofuji, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 641 days.

(21) Appl. No.: 12/305,321

(22) PCT Filed: Jun. 15, 2007

(86) PCT No.: PCT/JP2007/062172
§ 371 (c)(1),
(2), (4) Date: Mar. 17, 2009

(87) PCT Pub. No.: WO2007/148633
PCT Pub. Date: Dec. 27, 2007

(65) Prior Publication Data
US 2009/0275342 A1    Nov. 5, 2009

(30) Foreign Application Priority Data
Jun. 19, 2006    (JP) .................................. 2006-169429

(51) Int. Cl.
*H04J 1/16*    (2006.01)
(52) U.S. Cl. .................................... 370/252; 370/395.4
(58) Field of Classification Search .................. 370/229, 370/230, 232, 233, 234, 235, 241, 252, 351, 370/389, 395.1, 395.4, 431, 437, 449, 464, 370/465; 455/403, 422.1, 450, 7, 24
See application file for complete search history.

(56) References Cited

U.S. PATENT DOCUMENTS

| 2005/0208973 A1* | 9/2005 | Iochi ............................ 455/561 |
| 2005/0281226 A1* | 12/2005 | Lee et al. ..................... 370/329 |
| 2006/0094436 A1* | 5/2006 | Kim et al. .................... 455/450 |

(Continued)

FOREIGN PATENT DOCUMENTS

JP    2004-208234 A    7/2004

(Continued)

OTHER PUBLICATIONS

3GPP TR 25.813 V7.0.0, Jun. 19, 2006, "Radio interface protocol aspects," 39 pages.

(Continued)

*Primary Examiner* — Kwang B Yao
*Assistant Examiner* — Obaidul Huq
(74) *Attorney, Agent, or Firm* — Osha • Liang LLP

(57) ABSTRACT

A channel quality information reporting method includes a setting step, wherein the number N of blocks for which the mobile station reports channel quality information among the M blocks is set in accordance with an amount of traffic; a reporting step, wherein the base station reports the number N of blocks to the mobile station; a receiving step, wherein the mobile station receives the number N of blocks from the base station; a selecting step, wherein the mobile station selects N pieces of channel quality information from M pieces of channel quality information corresponding to the M blocks; an averaging step, wherein the mobile station averages pieces of channel quality information excluding the selected N pieces of the channel quality information; and a reporting step, wherein the mobile station reports the N pieces of channel quality information and the averaged channel quality information to the base station.

8 Claims, 8 Drawing Sheets

U.S. PATENT DOCUMENTS

| | | | |
|---|---|---|---|
| 2006/0198293 A1 | 9/2006 | Nishio et al. | |
| 2006/0268983 A1* | 11/2006 | Kwon et al. | 375/240.11 |
| 2007/0026813 A1* | 2/2007 | Khan | 455/69 |
| 2007/0195897 A1 | 8/2007 | Cheng et al. | |
| 2007/0242636 A1* | 10/2007 | Kashima et al. | 370/329 |

FOREIGN PATENT DOCUMENTS

| | | |
|---|---|---|
| JP | 2006-148490 A | 6/2006 |
| WO | 2005/015801 A2 | 2/2005 |
| WO | 2005/089000 A1 | 9/2005 |

OTHER PUBLICATIONS

3GPP TR 25.814 V7.0.0, Jun. 15, 2006, "Physical layer aspects for evolved Universal Terrestrial Radio Access (UTRA)," 126 pages.

3GPP TS 25.214 V7.1.0, Jun. 15, 2006, "Physical layer procedures (FDD)," 59 pages.

International Search Report issued in PCT/JP2007/062172, mailed on Sep. 18, 2007, with translation, 5 pages.

Written Opinion issued in PCT/JP2007/062172, mailed on Sep. 18, 2007, 4 pages.

* cited by examiner

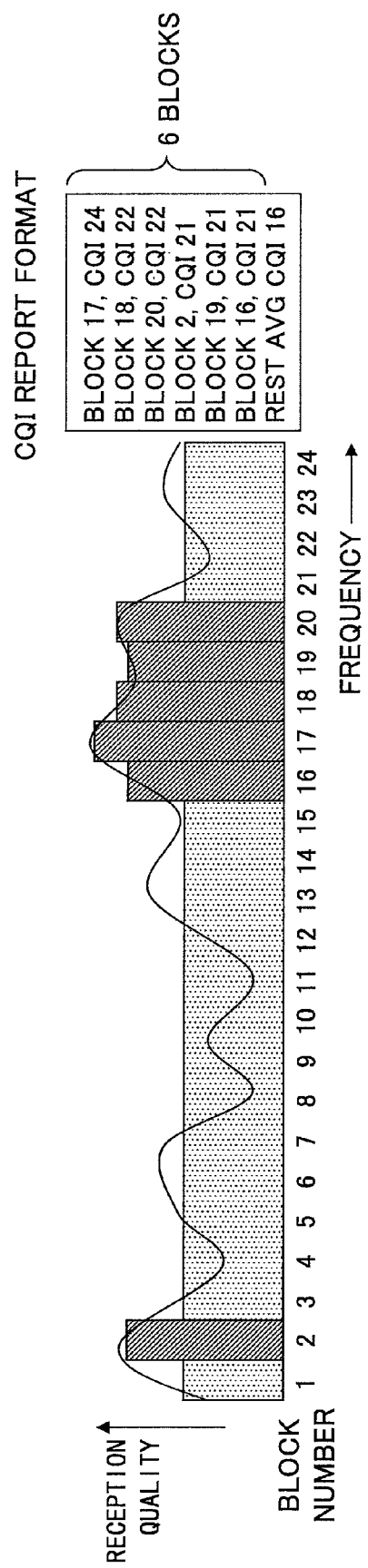

BASE STATION, MOBILE STATION, AND CHANNEL QUALITY INFORMATION REPORTING METHOD

TECHNICAL FIELD

The present invention relates to a base station, a mobile station, and a channel quality information reporting method, and specifically to a technology for controlling the number of blocks with which channel quality information is reported when a system bandwidth is divided into plural blocks.

BACKGROUND ART

In a mobile communications environment of HSDPA (High Speed Downlink Packet Access), a base station (eNodeB) uses a Channel Quality Indicator (CQI) reported from a mobile station (UE) when scheduling radio resources for the mobile station. Specifically, the mobile station receives a pilot channel and the like from the base station, measures quality information such as a Signal to Interference Ratio (SIR) (S1), and feeds back the CQI to the base station (S2), as shown in FIG. 1. The base station uses the CQIs reported from each mobile station and carries out scheduling such as allocation of appropriate radio resources (See 3GPP TS 25.214, "Physical layer procedures (FDD)").

Typically, the CQI is 5-bit data. The mobile station can measure the CQI every 2 ms. Therefore, the radio resource of 5 bits/2 ms=2.5 kbps is required for each mobile station in order to report the CQI, if the mobile station reports the CQI at every measurement of the CQI.

SUMMARY OF INVENTION

Problem to be Solved by the Invention

In a next generation mobile communications environment such as 3GPP Evolved UTRA and UTRAN, the base station can allocate for the mobile station the resource blocks into which the system bandwidth is divided in the frequency domain. Typically, a radio resource is divided into 24 blocks in the frequency direction and into sub-frames of 0.5 ms as a transmission unit in the time direction, as shown in FIG. 2. The base station needs to receive the CQIs corresponding to the resource blocks from the mobile stations in order to carry out appropriate scheduling with respect to each resource block.

FIG. 3 shows a CQI report format and signal reception quality measured at the mobile station. The signal reception quality measured at the mobile station varies in the frequency direction. The mobile station calculates the CQIs corresponding to resource blocks from the signal reception quality, and produces the CQI report format from the calculated CQI. For example, the CQIs are sorted in a block number order, and the CQI report format is composed of pieces of CQI information corresponding to the 24 blocks.

When it is assumed as above that the CQI is 5-bit data, the radio resource of 5 bit×24/0.5 ms=240 kbps is required for each mobile station in order to report the CQIs. In this manner, when the system bandwidth is divided into the plural resource blocks, the amount of information for reporting the CQIs is increased.

The present invention has been made in view of the above, and is directed to reduction of radio resources required for channel quality information reported from a mobile station to a base station.

Means for Solving the Problem

The above objective of the present invention is achieved by a base station that divides a system bandwidth into M blocks and allocates data to be transmitted to a mobile station for the divided blocks, the base station comprising: an N setting portion that sets the number N of the blocks with which the mobile station reports channel quality information among the M blocks; and a control information generation portion that generates control information for reporting the number N of the blocks to the mobile station.

In addition, the above objective of the present invention is achieved by a mobile station that communicates with a base station that divides a system bandwidth into M blocks and allocates data for the divided blocks in order to transmit the data, the mobile station comprising: an N reception portion that receives from the base station the number N of the blocks for which channel quality information is to be reported among the M blocks, the number N being set in accordance with an amount of traffic; an N selection portion that selects N pieces of channel quality information from M pieces of channel quality information that correspond to the M blocks; a remaining channel quality information averaging portion that averages pieces of channel quality information excluding the selected N pieces of channel quality information; and a feedback information generation portion that generates feedback information for reporting the N pieces of channel quality information and the averaged channel quality information to the base station.

Moreover, the above objective of the present invention provides a channel quality information reporting method in a communications system including a base station and a mobile station that communicates with the base station, wherein the base station divides a system bandwidth into M blocks and allocates data to be transmitted to a mobile station for the divided blocks in order to transmit the data, the channel quality information reporting method comprising: a setting step, wherein the number N of blocks for which the mobile station reports channel quality information among the M blocks is set in accordance with an amount of traffic; a reporting step, wherein the base station reports the number N of blocks to the mobile station; a receiving step, wherein the mobile station receives the number N of blocks from the base station; a selecting step, wherein the mobile station selects N pieces of channel quality information from M pieces of channel quality information corresponding to the M blocks; an averaging step, wherein the mobile station averages pieces of channel quality information excluding the selected N pieces of the channel quality information; and a reporting step, wherein the mobile station reports the N pieces of channel quality information and the averaged channel quality information to the base station.

Advantage of the Invention

According to an example of the present invention, the radio resources that are required for the CQIs to be reported from the mobile station to the base station can be reduced.

BRIEF DESCRIPTION OF THE DRAWINGS

FIG. 4A is a view showing an example of a relationship between signal reception quality measured by a mobile station and a CQI report format, according to an example of the present invention.

Figure 1:
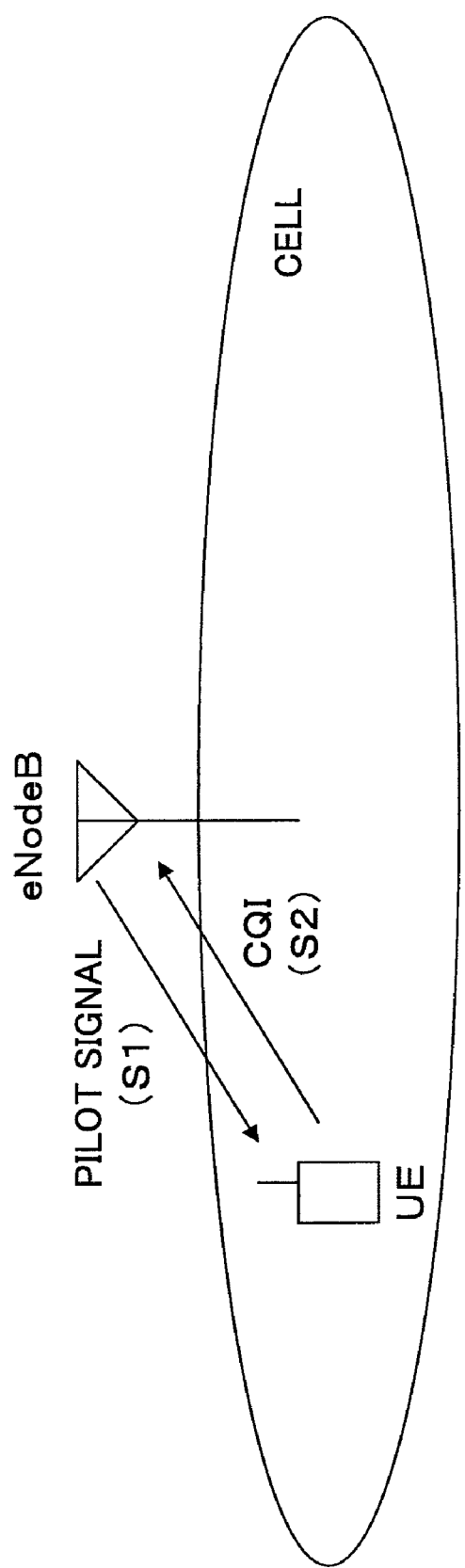
FIG. 1 is a view showing procedures of reporting quality information from a mobile station to a base station.
Figure 2:
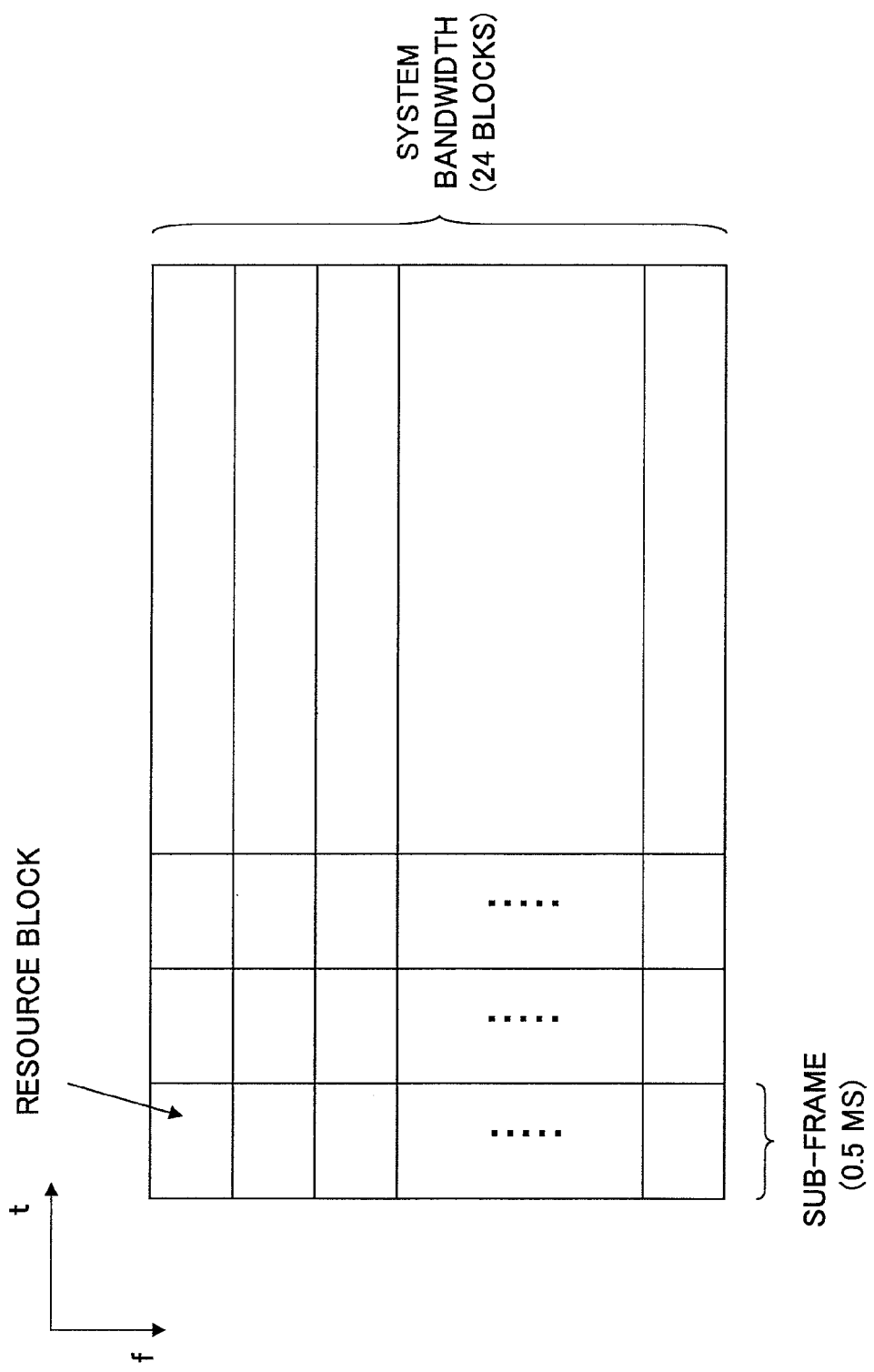
FIG. 2 is a view showing a resource block into which a system bandwidth is divided in the frequency domain.

LIST OF REFERENCE SYMBOLS 10 mobile station
101 reception RF portion
103 CQI measurement portion
105 Best N selection portion
107 N reception portion
109 remaining CQI averaging portion
111 feedback information generation portion
113 transmission buffer
115 transmission signal generation portion
117 multiple combining portion
119 transmission RF portion
20 base station
201 reception RF portion
202 CQI reception portion
205 scheduler
207 N setting portion
209 control information generation portion
211 transmission buffer
213 transmission signal generation portion
215 multiple combining portion
217 transmission RF portion

BEST MODE FOR CARRYING OUT THE INVENTION

Referring to the drawings, an example of the present invention will be described.

In the following example, it is assumed that a 5-bit CQI is used as channel quality information reported from a mobile station (UE) to a base station (eNodeB), a system bandwidth is divided into 24 resource blocks, and a sub-frame as a transmission unit of a radio frame is 0.5 ms.

<CQI Report Format>

Figure 3:
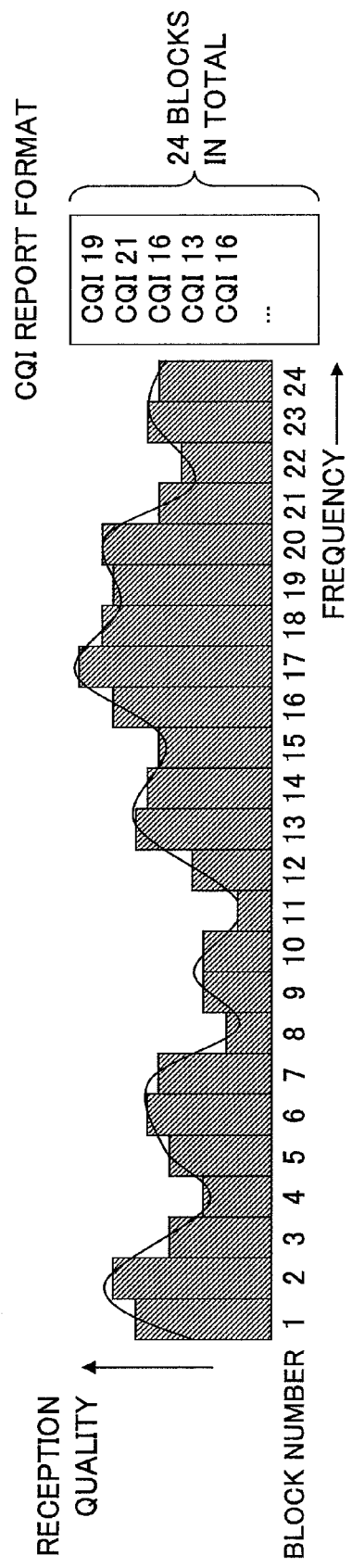
FIG. 3 is a view showing CQI report format and signal reception quality measured at the mobile station.

As stated above, when the CQI report format shown in FIG. 3 is used, the radio resource of 240 kbps is required for each mobile station. In this example of the present invention, the mobile station selects N CQIs in the order of the decreasing signal reception quality (in the order of the decreasing CQIs). Regarding the selected N CQIs, the mobile station reports the resource block numbers and the CQI values to the base station. The remaining CQIs are averaged and the CQI report format having an information amount of N+1 CQIs is generated. By employing such a report format, the information amount of the CQI report format is expressed as $\{a \cdot (N+1) + b \cdot N\}/(a \cdot M)$, where a is the number of bits in the CQI, b is the number of bits required to discriminate the resource block numbers, and M represents the number of the resource blocks in one sub-frame. When the system bandwidth is divided into the 24 resource blocks, b is equal to 5 because 5 bits are required to uniquely express the resource block number.

Figure 4B:
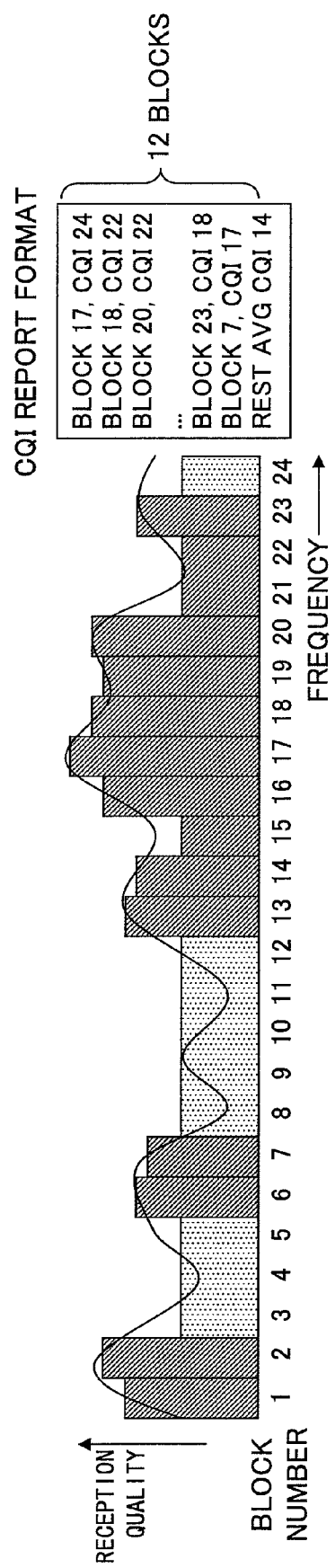
FIG. 4B is a view showing another example of a relationship between signal reception quality measured by a mobile station and a CQI report format, according to an example of the present invention.

FIG. 4A shows the CQI report format in the case of N=6, and FIG. 4B shows the CQI report format in the case of N=12. As shown, each CQI in the CQI report format may be sorted in the descending order. In the case of a=5, b=5, and N=6, the information amount of the CQI report format is 65/120; and in the case of N=12, the information amount of the CQI report format is 125/120. Namely, when N becomes 12 in the case of a=5, b=5, the reporting information amount is increased. However, in the case of a=6, the information amount is reduced to 138/144. In such a manner, the maximum value of N that can reduce the information amount (referred to as Nmax, below) is limited depending on the values of a and b. Therefore, N may specifically take a value from zero to Nmax. In addition, when N is set to be Nmax+1, the mobile station may report the CQIs of all the M resource blocks.

The base station carries out scheduling in order to allocate the resource blocks taking account of the CQIs reported from the mobile station. While various algorithms are conceivable as scheduling algorithms, a resource block can be allocated to a user having the largest CQI value among the CQIs reported for corresponding resource blocks. Such a way of allocation is called MaxC/I. The resource blocks that are excluded from the N CQIs and represented by the averaged value can be scheduled using the reported averaged value. MaxC/I cannot provide fairness among users, while it is known that MaxC/I can maximize throughput of the system. In order to provide the fairness among users, the CQIs reported for the corresponding resource blocks are converted into a metric of proportional fairness (PF), and a PF scheduling can be employed. When providing service where a transmission delay is very important as communications quality, the PF metric may be converted into Modified Largest Weighted Delay First (M-LWDF) or Exponential Metric, and scheduling may be carried out based on the M-LWDF or Exponential algorithm. Each one of these has quality where the resource block is allocated with high probability basically when the CQI is larger. Because radio transmission circumstances between the users subsequently independently vary, when the CQI is larger (namely, when spontaneous radio channel conditions are better), the resource block is allocated, thereby dramatically improving radio transmission efficiency. Such effect is called multi-user diversity.

When these scheduling algorithms are employed, there is a tendency where the number of resource blocks to be simultaneously allocated is decreased as the number of the users in the same cell is increased. Therefore, when there are a large number of the users in the same cell, it is more probable that reporting the M CQIs corresponding to the entire resource blocks results in reporting in vain. Namely, it is beneficial to adjust the N value depending on the number of the users in the same cell. By making the N value small when there are a large number of the users and large when there are a small number of the users, the CQI reporting amount and the radio transmission efficiency can be kept in balance. However, because there are not always data to be transmitted to all the users, the N value may be adjusted taking the amount of data that remains in a transmission buffer. The N value may be adjusted by measuring in the base station the degree of congestion, i.e., the amount of traffic, obtained by taking account of the number of the users, the amount of remaining data, and the like. Namely, the N value becomes small when the amount of traffic is large, and the N value becomes large when the amount of traffic is small. The N value set by the base station is adjusted for all the users through, for example, broadcast information. Alternatively, the N value is adjusted for an individual user by taking account of required quality of the service for the user. For example, the N value becomes large for the user having a large amount of data, and the N value may be small for a user having an amount of data small enough to empty the transmission buffer even when the number of the allocated resource blocks is decreased. The mobile station for which the base station specifies the N value selects the N resource blocks whose CQIs are to be reported. In addition, regarding the resource blocks that are not selected within the N resource blocks, an average value is reported, thereby avoiding a problem in that there may exist resource blocks that cannot be allocated by the scheduler.

The base station may average the number of blocks that are allocated in a recent frame for one user as a specific setting method of the N value in order to obtain the N value. Here, an example is taken where 2 resource blocks are allocated for a user A and 4 resource blocks are allocated for a user B in a previous sub-frame, and 4 resource blocks are allocated for the user A and 6 resource blocks are allocated for a user C in a second previous sub-frame. When the N value is calculated using the number of the resource blocks per user allocated in up to the second previous sub-frames, the N value becomes 4 from N=(2 blocks+4 blocks+4 blocks+6 blocks)/the total number of the users (4)=4. The calculated N value may have a margin of $\alpha$.

According to this example, because the base station specifies the N value, i.e., the report format, the report format to be received by the base station is specified in advance. Therefore, the base station can be in a standby mode with the specified report format.

<Signal Flow>

Figure 5:
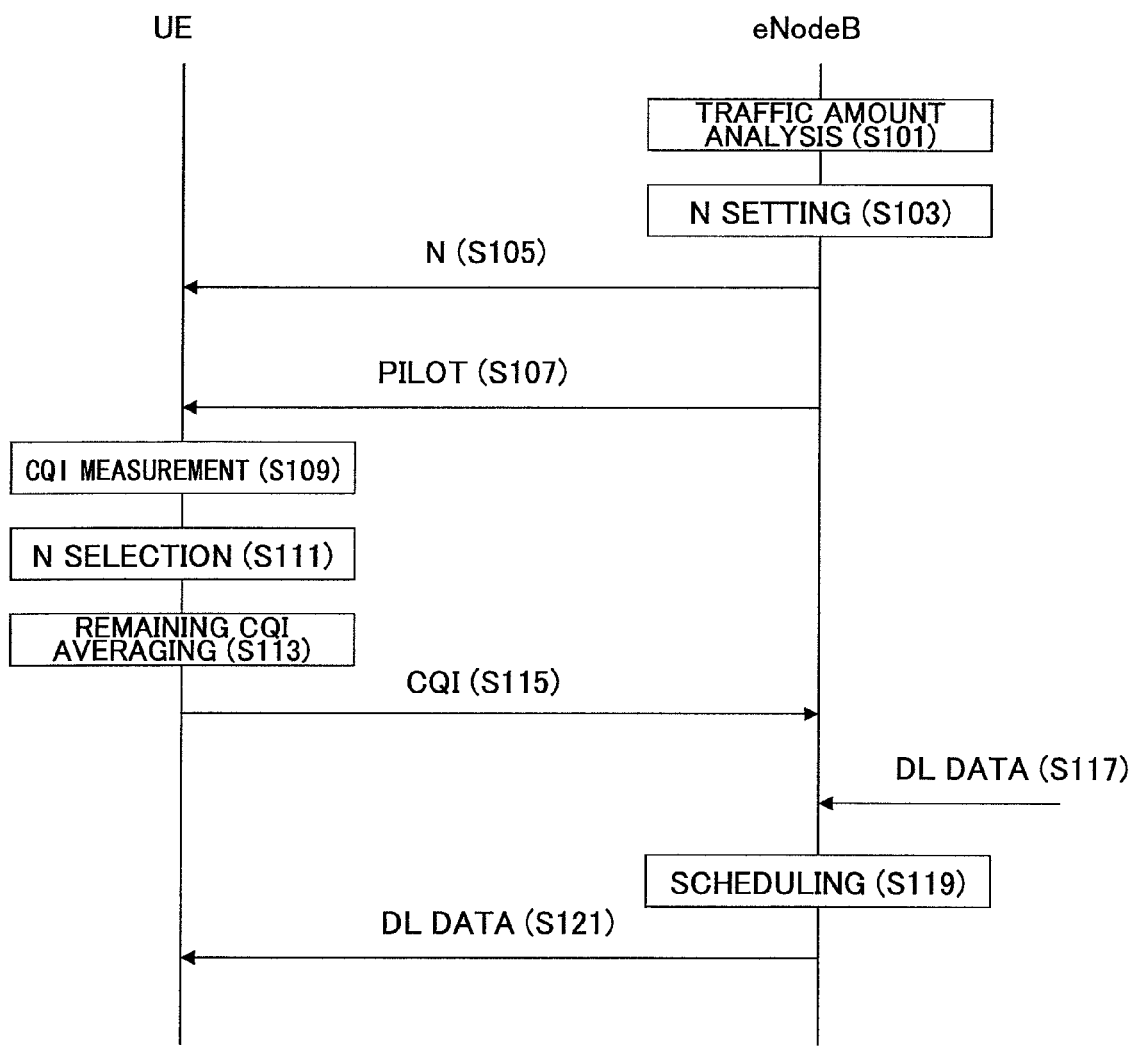
FIG. 5 is a view showing a signal flow communicated between a base station and a mobile station, according to an example of the present invention.

FIG. 5 shows a flow of signals communicated between the base station (eNodeB) and the mobile station (UE), according to the example of the present invention.

The base station analyzes the amount of traffic and comprehends the degree of congestion (S101). When the amount of traffic is large the N value is set small, and when the amount of traffic is small the N value is set large (S103). The set N value is reported to the mobile station (S105).

When the mobile station receives a pilot signal or the like (S107), the mobile station measures the CQI (S109). Next, the N CQIs are selected in a descending order (S111). The remaining CQIs are averaged (S113). The mobile station produces the CQI report format whose information amount corresponds to (N+1) CQIs, and reports the same to the base station (S115).

When downlink data (DL data) to the mobile station are in the buffer (S117), the base station carries out scheduling so that a suitable resource block is allocated based on the CQIs reported from the mobile station (S119), and transmits to the mobile station (S121).

<Mobile Station Configuration>

Figure 6:
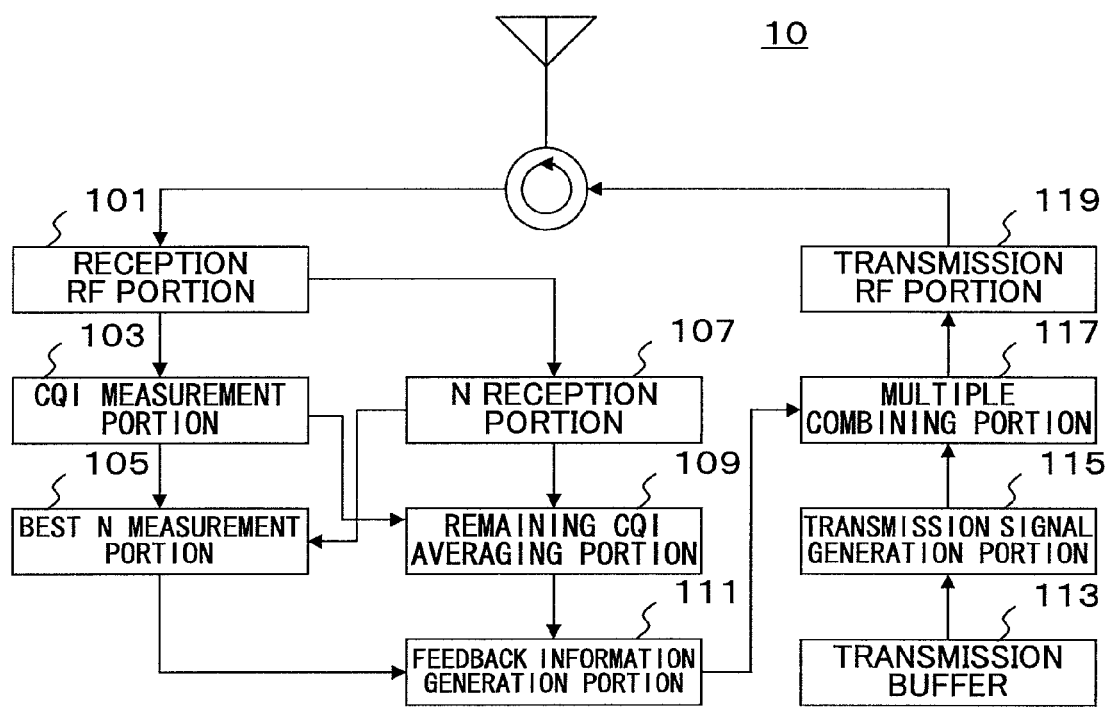
FIG. 6 is a block diagram of a mobile station according to an example of the present invention.

FIG. 6 is a block diagram of a mobile station 10 according to an example of the present invention. The mobile station 10 has a reception RF portion 101, a CQI measurement portion 103, a Best N selection portion 105, an N reception portion 107, a remaining CQIs averaging portion 109, a feedback information generation portion 111, a transmission buffer 113, a transmission signal production portion 115, a multiple combining portion 117, and a transmission RF portion 119.

The reception RF (Radio Frequency) portion 101 receives a signal transmitted from a base station, and separates signal components such as a pilot channel, a broadcast channel, and a control channel. Upon receiving the pilot channel and the like, the CQI measurement portion 103 measures a Signal to Interference Ratio (SIR) or the like, and generates a CQI. On the other hand, when the mobile station 10 receives the block number N of the blocks that report the CQIs, the block number N is received by the N reception portion 107 through the reception RF portion 101. The Best N selection portion 105 selects the N CQIs among the M CQIs in descending order, the M corresponding to the number of blocks that are measured by the CQI measurement portions 103. The remaining (M-N) CQIs are averaged by the remaining CQI averaging portion 109. The feedback information generation portion 111 generates the CQI report format wherein the N CQIs and the averaged CQIs are combined. As stated above, the CQI information amount is $\{a \cdot (N+1)+b \cdot N\}/(a \cdot M)$. When the N value is greater than the threshold (Nmax), the feedback information generation portion 111 may generate the CQI report format that reports the CQIs of all the M resource blocks.

The transmission buffer 113 stores user data to be transmitted from the mobile station 10 to the base station. When user data are stored in this buffer, the transmission signal production portion 115 generates a transmission signal to be transmitted to the base station. The multiple combining portion 117 multiplexes the CQI report format generated in the feedback information generation portion 111 and the transmission signal generated in the transmission signal production portion 115, and transmits the multiplexed signal to the base station through the transmission RF portion 119.

<Base Station Configuration>

Figure 7:
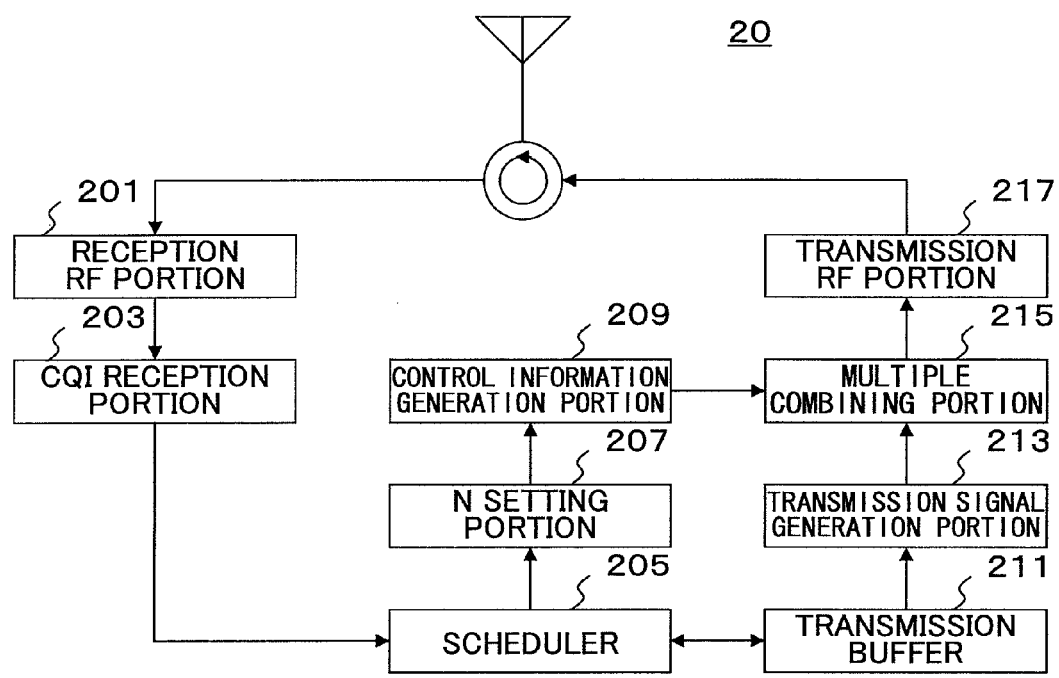
FIG. 7 is a block diagram of a base station according to an example of the present invention.

FIG. 7 is a block diagram of a base station 20 according to an example of the present invention. The base station 20 has a reception RF portion 201, a CQI reception portion 203, a scheduler 205, an N setting portion 207, a control information generation portion 209, a transmission buffer 211, a transmission signal production portion 213, a multiple combining portion 215, and a transmission RF portion 217.

The reception RF portion 201 receives a signal transmitted from the mobile station and separates signal components from the received signal. When the base station 20 receives CQIs from the mobile station, the CQIs are received by the CQI reception portion 203 through the reception RF portion 201.

The scheduler 205 refers to Quality of Service (QoS) of user data stored in the transmission buffer 211 and/or takes account of an amount of remaining data, thereby carrying out scheduling to allocate user data for a suitable resource block.

As a result of this scheduling, a size (transport block size) of data allocated for a resource block is specified to the transmission buffer 211. In addition, the scheduler 205 reports allocation information and the amount of traffic such as the amount of data remaining in the transmission buffer to the N setting portion 207. The N setting portion 207 controls the number N of the blocks for which the mobile station reports the CQI, in accordance with the amount of traffic. As stated above, when the amount of traffic is large the N value is decreased, and when the amount of traffic is small the N value is increased. In addition, the N setting portion 207 may set the N value for each mobile station in accordance with service provided to the corresponding mobile station. The control information generation portion 209 generates control information for reporting the number N of the blocks to the mobile station using the broadcast channel and the control channel.

The transmission buffer 211 stores user data to be transmitted from the base station 20 to the mobile station. When user data are stored in this buffer, the transmission signal production portion 213 generates a transmission signal for transmitting user data having the data size specified by the scheduler 205 to the mobile station. The multiple combining portion 215 multiplexes the control information (including the number N of the blocks) generated in the control information generation portion 209 and the transmission signal generated in the transmission signal production portion 213, and transmits the multiplexed signal to the mobile station through the transmission RF portion 217.

As described above, according to the example of the present invention, the radio resources that are required for the CQIs to be reported from the mobile station to the base station can be reduced.

This international application claims the benefit of the priority date of Japanese Patent Application No. 2006-169429 filed on Jun. 19, 2006, and the entire content of which application is herein incorporated hereby by reference.

The invention claimed is:

1. A base station that divides a system bandwidth into M blocks and allocates data to be transmitted to a mobile station for the divided blocks, the base station comprising:
   a unit that sets, for each mobile station, the number N of the blocks for which the mobile station reports channel quality information among the M blocks such that the number N increases as an amount of data of the mobile station increases, wherein M is a positive integer greater than or equal to 2 and N is a positive integer;
   a control information generation portion that generates control information for reporting the number N of the blocks to the mobile station;
   a channel quality information receiving unit for receiving, from the mobile station, N channel quality information pieces, and an average value of channel quality information pieces other than the N channel quality information pieces; and
   a scheduling unit which allocates a radio resource to the mobile station using the N channel quality information pieces, and the average value of channel quality information pieces other than the N channel quality information pieces.

2. The base station of claim 1, wherein the unit that sets N decreases the number N when an amount of traffic is large and increases the number N when the amount of traffic is small.

3. The base station of claim 1, wherein the unit that sets N averages the number of the blocks allocated for a predetermined period per one mobile station and calculates the number N.

4. The base station of claim 1, wherein the unit that sets N sets the number N depending on service provided for each mobile station.

5. The base station of claim 1, wherein the unit that sets N increases the number N with respect to a mobile station when an amount of traffic allocated for the mobile station is large, and decreases the number N when an amount of traffic allocated for the mobile station is small.

6. A mobile station that communicates with a base station that divides a system bandwidth into M blocks and allocates data for the divided blocks in order to transmit the data, the mobile station comprising:
   a unit that receives from the base station the number N of the blocks for which channel quality information is reported, which number N is set for each mobile station, such that the number N increases as an amount of data of the mobile station increases, wherein M is a positive integer greater than or equal to 2 and N is a positive integer;
   a unit that selects N pieces of channel quality information from M pieces of channel quality information that correspond to the M blocks;
   a remaining channel quality information averaging portion unit that averages pieces of channel quality information excluding the selected N pieces of channel quality information; and
   a feedback information generation unit that generates feedback information for reporting the N pieces of channel quality information and the averaged channel quality information to the base station.

7. The mobile station of claim 6, wherein the feedback information generation portion generates feedback information for reporting the M pieces of channel quality information corresponding to the M blocks to the base station when the N is greater than a predetermined threshold.

8. A channel quality information reporting method in a communications system including a base station and a mobile station that communicates with the base station, wherein the base station divides a system bandwidth into M blocks and allocates data to be transmitted to a mobile station for the divided blocks in order to transmit the data, the channel quality information reporting method comprising:
   a setting step, wherein the number N of blocks for which the mobile station reports channel quality information among the M blocks, such that the number N increases as an amount of data of the mobile station increases, wherein M is a positive integer greater than or equal to 2 and N is a positive integer;
   a reporting step, wherein the base station reports the number N of blocks to the mobile station;
   a receiving step, wherein the mobile station receives the number N of blocks from the base station;
   a selecting step, wherein the mobile station selects N pieces of channel quality information from M pieces of channel quality information corresponding to the M blocks;
   an averaging step, wherein the mobile station averages pieces of channel quality information excluding the selected N pieces of the channel quality information;
   a reporting step, wherein the mobile station reports the N pieces of channel quality information and the averaged channel quality information to the base station;
   a receiving step, wherein the base station receives, from the mobile station, N channel quality information pieces, and an average value of channel quality information pieces other than the N channel quality information pieces; and
   an allocating step, wherein the base station allocates a radio resource to the mobile station using the N channel quality information pieces, and the average value of channel quality information pieces other than the N channel quality information pieces.

* * * * *